UNITED STATES PATENT OFFICE.

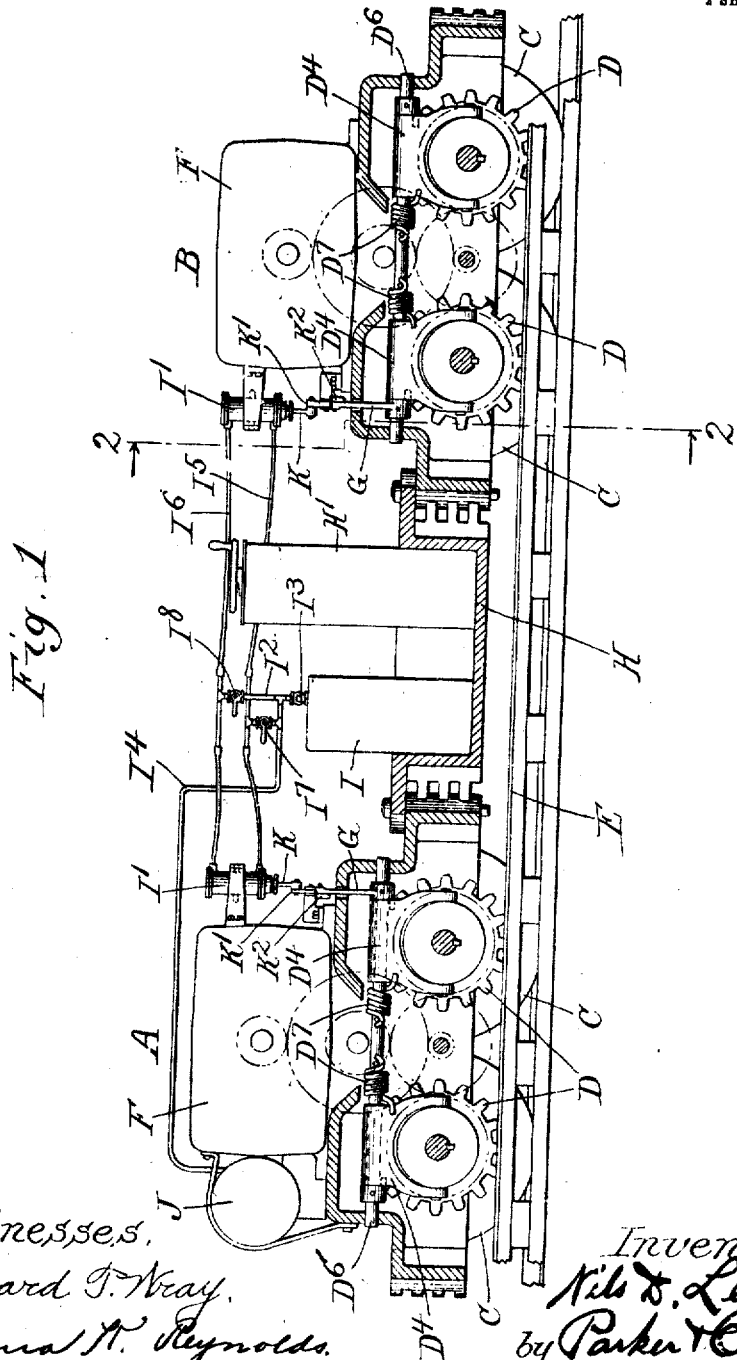

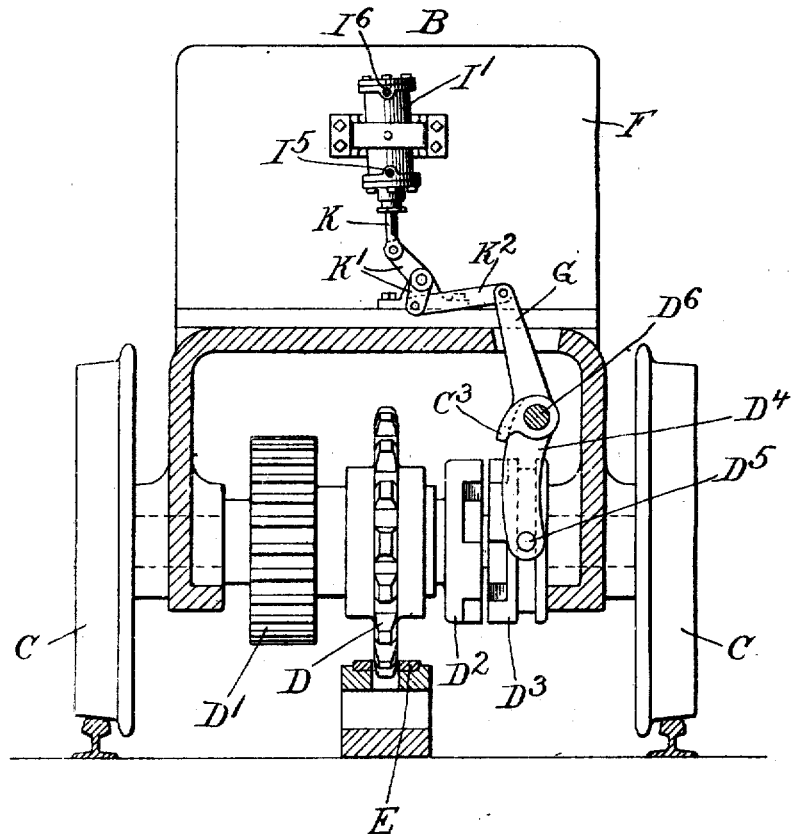
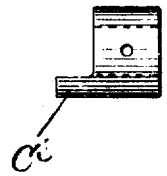

NILS DAVID LEVIN, OF CHICAGO, ILLINOIS, ASSIGNOR TO GOODMAN MANUFACTURING COMPANY, OF CHICAGO, ILLINOIS, A CORPORATION OF ILLINOIS.

RACK-RAIL AND TRACTION LOCOMOTIVE.

No. 909,430.

Specification of Letters Patent.

Patented Jan. 12, 1909.

Application filed January 28, 1907. Serial No. 354,428.

*To all whom it may concern:*

Be it known that I, NILS D. LEVIN, a citizen of the United States, residing at Chicago, in the county of Cook and State of Illinois, have invented a certain new and useful Improvement in Rack-Rail and Traction Locomotives, of which the following is a specification.

This invention relates to rack rail and traction locomotives and has for its object to provide a new and improved device of this description.

The invention is illustrated in the accompanying drawings, wherein—

Figure 1 is a sectional view showing a system embodying the invention. Fig. 2 is a cross sectional view through one of the locomotives with parts omitted. Fig 3 is a view showing the part for throwing the clutch out of gear.

Like parts are indicated by the same letters in all the figures.

When the locomotive is running upon a heavy grade it is arranged so that it is driven by means of a sprocket wheel and rack rail and when the grade is light the rack rail is omitted or otherwise rendered inoperative and the locomotive is driven by the track wheels. The track and sprocket wheels are of different diameters and the motor is arranged so that it may be connected with either one or the other so as to make a rack rail drive or a traction drive.

Referring now to the drawings, there are illustrated in Fig. 1 two locomotives, A and B. Each of these locomotives is provided with track wheels C and sprocket wheels D. The sprocket wheels are arranged to engage the rack rail E. As illustrated, each axle is provided with a sprocket wheel. These sprocket wheels D are loose upon the axles and are connected to the driving motor F, in any desired manner so as to be driven thereby. There is connected with each sprocket wheel a gear $D^1$, said gear being connected by suitable gearing with the motor. Connected with each sprocket wheel is a clutch member $D^2$ which rotates therewith. Opposed to the clutch member $D^2$ is another clutch member $D^3$ which is feathered or otherwise fastened to the axle so as to rotate therewith. Some suitable means is provided for controlling the clutch members so as to move them into and out of engagement. Any suitable means for this purpose may be used. As herein illustrated, there is associated with each clutch member $D^3$ a controlling member $D^4$ which is preferably forked and is provided with pins $D^5$ which fit in grooves in the clutch members $D^3$ so as to allow the rotation thereof, and still provide means for moving it along the axle. The controlling members $D^4$ are mounted upon the shaft $D^6$ so that their position may be controlled by moving said shaft. In view of the fact that the track wheels and sprocket wheels are of different diameters, and since in each locomotive there are two clutches connected with the shaft, the probability of the clutches registering simultaneously is remote and hence some means must be provided for securing a proper engagement of the clutch members when desired. This result is secured by elastically connecting the controlling members $D^4$ with the shaft $D^6$ and by loosely mounting them upon said shaft and providing springs $D^7$ which are fastened at one end to the shaft and at the other end to the controlling member. By this construction the shaft may be moved to what would correspond to the closed position of the clutches even when the clutch members do not register, this movement simply putting a pressure upon the clutch members. As soon as the wheels have turned so that they do register, this pressure causes the clutch members $D^3$ to move into engagement with the opposed clutch members $D^2$.

The clutch members are provided with means for throwing them out of gear. This may be accomplished in any desired manner, as, for example, by providing a projection $C^3$ arranged so as to engage the members $D^4$. Each clutch member has associated with it a projection $C^3$. This projection may be fastened upon a car attached to the shaft $D^6$. When the shaft is rotated to bring the clutch members into engagement these projections $C^3$ are so located as to be out of the way. When the shaft is moved in the opposite direction they engage the members $D^4$ and move them out of engagement.

Some suitable means is provided for moving the shaft $D^6$ as, for example, the levers G. When single units are used these levers can be moved by hand or in any other desired manner. When a plurality of locomotives are used the various clutches are preferably controlled by the operator from a central position. As shown in Fig. 1 the operator stands upon the platform H which is located between any two of the locomotives. This platform preferably contains the controllers H¹ for the motors on the various locomotives and is also provided with the controlling means for the clutches which may be of any suitable description. As herein shown these clutches are controlled by means of air. A compressor I is located on the platform H and each locomotive is provided with a controlling cylinder I¹ connected in the system so as to be properly supplied with air. There is also preferably an air chamber or reservoir J. Pipes I⁵ lead to one end of the cylinders I¹ and pipes I⁶ lead to the other end thereof, the pipes being controlled by valves I⁷, I⁸. By this arrangement air can be admitted to either end of the cylinders so as to move the pistons therein. These pistons are connected by rods K, cranks K¹ and links K² with the controlling levers G for the shafts D⁶.

The use and operation of this invention are as follows: When the locomotive is on a heavy grade, the sprocket wheels D engage the rack H and the locomotives are thus driven through the sprocket wheels and rack rail. When the grade becomes light or the track is substantially level, the rack is omitted and the sprocket wheel therefore becomes inoperative when it runs off the racks and the locomotives are driven from the track wheels by bringing the clutch members D² and D³ into engagement. When the clutch members are controlled from the central platform they are brought into engagement by opening the valve I⁸. This permits the air to enter the cylinders I¹ and causes the pistons to be driven downwardly so as to rock the shafts D⁶ through the levers G which are rigidly connected therewith. This movement of the shaft puts a tension upon the springs D⁷ which press the clutch members together and as soon as they register the clutch members D³ are forced into engagement with the clutch members D², thus connecting the track wheels with the motor through the sprocket wheels. Since the track wheels are of greater diameter than the sprocket wheels, it will be seen that a greater speed will thus be secured on the lighter grades. It will further be seen that if the clutch members are brought into engagement when the sprocket wheels are still in engagement with the rack a brakage will result because of the difference of the diameters of the sprocket and track wheels for when they are thus both connected to the motor there is an enforced slippage of the track wheels. It will be seen that both these effects are produced by very simple mechanism and without having to change the connection between the motor and the sprocket wheel for the sprocket wheel is always connected to the motor and the sprocket wheel and track wheels are connected together when the clutch members are in engagement. It will further be seen that any number of locomotives may thus be connected together and the mechanism operated from the center position or platform.

When in the specification and claims the sprocket wheels and track wheels are said to be of different diameters it is to be understood that this means that the diameter of the tread of the track wheels is different from the pitch diameter of the sprocket wheels.

I claim:

1. A locomotive comprising a motor, two axles each provided with track wheels, a sprocket wheel rotatably mounted upon each axle, said sprocket wheels operatively connected with said motor, clutch members associated with each sprocket wheel, opposed clutch members connected with the axle so as to rotate therewith, a controlling device for each of said latter clutch members, said controlling members elastically connected with the means by which they are controlled.

2. The combination with a plurality of locomotives each provided with motors and sprocket wheels operatively connected therewith, track wheels with clutch devices for connecting and disconnecting the sprocket wheels and track wheels, of means for operating said clutch devices from a central or common point said means elastically connected with the clutch devices.

3. The combination with a plurality of locomotives each provided with a sprocket wheel and track wheels and a mechanism for operatively and positively connecting the sprocket and track wheels together, a controlling means located at a predetermined point and adapted to control the connecting mechanism on all locomotives said controlling means elastically connected with the mechanism for connecting the sprocket and track wheel together.

4. The combination with a plurality of locomotives each provided with a sprocket wheel, track wheels, clutches for connecting and disconnecting the sprocket and track wheels, and an air cylinder for controlling said clutches, of a controlling means located at a predetermined point for controlling said air cylinders on all said locomotives.

5. A combined traction and rack rail locomotive comprising a motor, a driving sprocket wheel operatively connected with said motor, track wheels associated with the locomotive, a clutch device comprising two members, one associated with the sprocket wheel and the other with the track wheels, a controlling device for one of such clutch members, and an elastic connection between such controlling device and the clutch member.

6. A combined traction and rack rail locomotive comprising a motor, a sprocket wheel operatively connected with said motor, track wheels associated with the locomotive, a clutch device comprising two members, one associated with the sprocket wheel and the other with the track wheels, a controlling device for one of such clutch members movably connected therewith, and a spring connecting the controlling device with the clutch member.

7. A combined traction and rack rail locomotive comprising a motor, a sprocket wheel operatively connected with said motor, track wheels associated with the locomotive, a clutch device comprising two clutch members, one associated with the sprocket wheel and the other with the track wheels, a shaft mounted upon said locomotive, means for rocking said shaft, and a spring connected with said shaft and one of said clutch members, the tension of which is varied by the relative movement of the shaft and the clutch member.

NILS DAVID LEVIN.

Witnesses:
EDNA K. REYNOLDS,
DONALD M. CARTER.